United States Patent

Tsukada et al.

[11] Patent Number: 5,948,499
[45] Date of Patent: Sep. 7, 1999

[54] FLOCKED MEMBER FOR WINDOW STABILIZER

[75] Inventors: Syouichi Tsukada, Moriyama; Sigeki Yamaguchi; Keizou Nagae, both of Konan, all of Japan

[73] Assignee: Gunze Limited, Kyoto-fu, Japan

[21] Appl. No.: 08/879,608

[22] Filed: Jun. 20, 1997

Related U.S. Application Data

[63] Continuation of application No. 08/550,404, Oct. 30, 1995, abandoned.

[51] Int. Cl.$^6$ .................................................. B05D 1/14
[52] U.S. Cl. .................................. 428/90; 428/97
[58] Field of Search .......................... 428/90, 97

[56] References Cited

U.S. PATENT DOCUMENTS 4,424,647  1/1984  Sasaki et al. .
5,189,840  3/1993  Yanagizawa et al. .
5,403,638  4/1995  Yanagizawa et al. .
5,442,815  8/1995  Cordova et al. ............... 2/161.7

FOREIGN PATENT DOCUMENTS

A 4-189621  7/1992  Japan .
A 5-213062  8/1993  Japan .
A 5-222661  8/1993  Japan .
A 6-171356  6/1994  Japan .

Primary Examiner—Terrel Morris
Attorney, Agent, or Firm—Armstrong, Westerman, Hattori, McLeland & Naughton

[57] ABSTRACT

The invention relates to a flocked member for window stabilizer comprising a polyethylene fiber having a viscosity-average molecular weight of 700,000 to 6,000,000.

10 Claims, 3 Drawing Sheets

FLOCKED MEMBER FOR WINDOW STABILIZER

This application is a Continuation of application Ser. No. 08/550,404 filed Oct. 30, 1995, now abandoned.

FIELD OF THE INVENTION

The present invention relates to a flocked member for a window stabilizer attached to a car, etc., specifically to a flocked member free of unpleasant frictional noise during opening or closing of a window.

BACKGROUND ART

With respect to a sashless door-type car, for example, a window stabilizer is attached to a door body for preventing vibration of a window, as a vibration insulation measure (see, FIG. 1). The window stabilizer whose maximal object is vibration insulation comprises a flocked member partially contacted with the window. The window stabilizer is different from weather strip which is primarily directed to seal between the door and window.

The above-mentioned description is specifically explained using drawings as follows. FIG. 1 demonstrates a schematic sectional view showing a whole front door. 1 is a window, which is basically supported by a door outer panel 4 and a door inner panel 2. 3 and 5 are reinforcement panels of panels 2 and 4, respectively. Weather strips 6, 7 made of rubber for sealing are fixed in contact with window 1 in conditions of allowing slip of window 1.

Further, S is a window stabilizer formed by fixing a flocked component 9 on a reverse U-shaped base 8. The stabilizer S is supported by the reinforcement panel 3. The flocked component 9 applies a desired pressure to the window to prevent vibration thereof.

In FIG. 1, the window stabilizer S is provided inside of the window. However, the window stabilizer S may be provided outside, or, both of inside and outside of the window. The number of window stabilizer S attached may be plural depending on the size of the door. FIG. 2 demonstrates an example of stabilizer S in a diagonal view. 10 is a supporting base provided with a flocked member. FIG. 3 is a sectional view showing an example of flocked component 9. In FIG. 3, flocked component 9 is formed by a flocked member 12 fixed on a supporting base 10. A coating layer composed of adhesive, synthetic resin, etc. is formed on the underside of the supporting base 10 to prevent removal of flocks.

A primary object of the flocked component 9 employed as a window stabilizer is directed to vibration insulation. However, the flocked component 9 should have functions such as rub resistance, slip properties, prevention of unpleasant friction noise, as well as prevention of damage caused by catching dust in a flocked member.

A variety of window stabilizers are proposed in considering such factors.

Japanese Unexamined Patent Publications 6-171356 and 6-226893 are exemplified as an attempt of improving such requirements. The former relates to a flocked member for a window stabilizer employing thermoplastic resins meeting special conditions. The thermoplastic resins include a composition of polyamide resins, polyester resins and ultra-high-molecular-weight polyethylene. The latter discloses technical means relating to a supporting element for window glass of a car with a flocked member. The supporting element comprises a specific ultra-high-molecular-weight polyethylene (A) and a specific polyethylene (B), and is characterized in that the element comprises a resin composition comprising a composition in which at least one of said (A) and (B) is modified, and a polyamide.

Although the flocked member for a window stabilizer disclosed in the publications are improved, the flocked member does not have sufficient effects on slip properties in wet conditions formed by wetting the window with rain drops and in semi-wet conditions formed in the process of drying water drops such as rain on the window, and on prevention of generating unpleasant noise.

DISCLOSURE OF THE INVENTION

Figure 1:
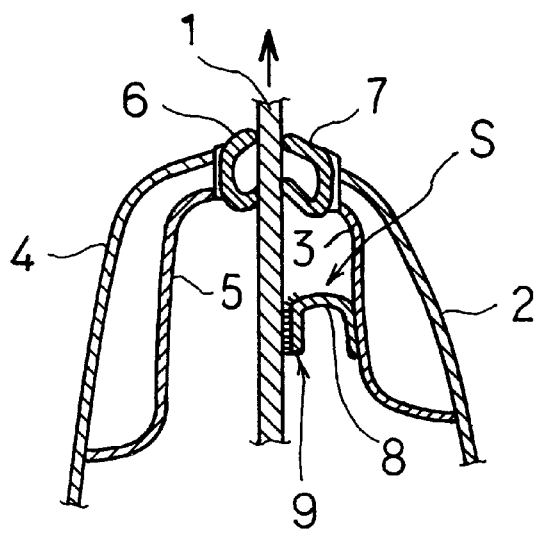
FIG. 1 is a schematic sectional view showing front door of a car.
Figure 2:
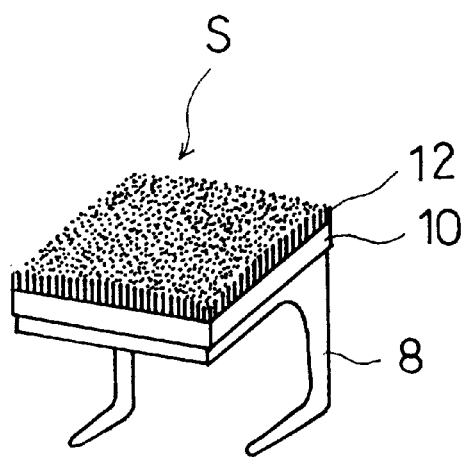
FIG. 2 is a diagonal view showing window stabilizer S of the invention.
Figure 3:
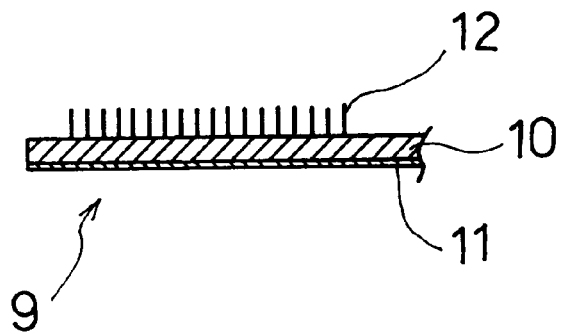
FIG. 3 is a sectional view of a flocked component.

The inventors have conducted extensive research to solve the above-mentioned problems leading to accomplishment of the invention. Thus, solution of said problems is easily accomplished by the following means.

The invention provides a flocked member for a a window stabilizer comprising a polyethylene fiber having a viscosity-average molecular weight of 700,000 to 6,000,000. In addition, the invention provides a flocked member for a window stabilizer comprising a 99-50% cross section ratio of polyethylene fiber having a viscosity-average molecular weight of 700,000 to 6,000,000 and a 1–50% cross section ratio of fluorofiber.

The flocked member of the invention may further comprise a polyethylene fiber having a viscosity-average molecular weight of less than 700,000.

The flocked member of the invention is preferably free of polyamide resin and polyester resin.

It is preferred that the polyethylene fiber of the invention should not be modified by unsaturated carboxylic acid.

The invention is described below in more detail.

According to the invention, "a window stabilizer" (hereinafter simply referred to as "stabilizer") has a function of vibration insulation and is applied to doors of a car, etc. Unlike weather strip with a sealing function, material, shape, structure, the number attached and position of the stabilizer are not specifically limited to, but a variety of styles of the stabilizer may be employed. In general, applying the stabilizer to a part of a window glass is sufficient, and the position at which the stabilizer is placed is generally inside (underside) of weather strip. The stabilizer is placed at a position to exert an effect of vibration insulation of the window. The number of stabilizers attached to is not specifically limited to, but generally one to several stabilizers are attached.

As a flocked member, a fiber made of polyethylene having a viscosity-average molecular weight (hereinafter simply referred to as molecular weight) of 700,000 to 6,000,000, preferably 1,000,000 to 2,500,000 is employed. The polyethylene fiber is preferably composed of high-molecularweight and ultra-high-molecular-weight polyethylene fiber having a molecular weight of 700,000 to 6,000,000. The molecular weight is determined according to viscometry. The polyethylene fiber having a molecular weight of 700,000 to 6,000,000 is superior to polypropylene, polyester or other materials in wear properties, high resistance to shock caused by pressure, and resistance to compressive deformation of flocked member, thereby preferable.

The polyethylene resin as a material of a flocked member is a polymer of ethylene, which may be a copolymer containing a small amount of olefin monomer, etc. The other monomers capable of copolymerizing with ethylene include propylene, butene, tetrafluoroethylene, chlorotrifluoroethylene, etc., which may be employed singly or a mixture thereof. Such copolymers preferably include ethylene-propylene copolymer, ethylene-butene copolymer, ethylene-tetrafluoroethylene copolymer, ethylene-chlorotrifluoro-ethylene copolymer.

However, the olefin monomer content in the copolymer is about 30 mole % or less, preferably about 10 mole % or less, more preferably about 5 mole % or less.

The polyethylene fiber of the invention comprising a high-molecular-weight and ultra-high-molecular-weight polyethylene resin having a molecular weight of about 700,000 to about 6,000,000, which may further comprise resins or materials having high slip properties as a third component. Addition of resins having inferior slip properties such as polyamide resin, polyester resin, etc., is not preferred. The third component includes ethylene-acrylate copolymer (eg. ethylene-methylacrylate copolymer, ethylene-ethylacrylate copolymer), ethylene-methacrylate copolymer (eg. ethylene-methylmethacrylate copolymer), ethylene-acrylic acid copolymer, ethylene-methacrylic acid copolymer, ethylene-vinylacetate copolymer, ethylene-tetrafluoroethylene copolymer, ethylene-vinylalcohol copolymer, ethylene-propylene copolymer, ethylene-propylene-diene terpolymer, ethylene-butene copolymer, ethylene-chlorotrifluoroethylene copolymer. The third component is used singly or in a mixture thereof.

The flocked member may be formed by mixing said polyethylene fiber with "other synthetic fiber" (other types of fibers). The amount of other synthetic fiber mixed ranges from about 1–50%. Preferable other synthetic fibers include fluorofiber, polyolefin fiber except for the polyethylene resin (e.g., polypropylene fiber). The amount of fluorofiber mixed is about 1–50%, preferably 5–30% in cross section ratio.

In the specification, "cross section ratio" means a ratio of cross section of other types of fiber to all cross section of the flocked member per unit area (1 cm$^2$) as percent.

In accordance with the invention, the flocked member comprising fibers mixed with fluorofiber is superior to the flocked member free of fluorofiber in elastic recovery which is an indication of durability. The fluorofiber is a fiber obtained from an aliphatic polymer containing fluorine. The fluorofiber is a homopolymer or copolymer or monomer of which half or more of hydrogen atoms are replaced by fluorine atoms, for example, includes perfluoropolymer, such as polytetrafluoroethylene (PTFE), copolymer of tetrafluoroethylene and perfluoroalkylvinylether (PFA), copolymer of tetrafluoroethylene and hexafluoropropylene (FEP), fluorinated hydrocarbons, such as polyvinylidene fluoride (PVDF), copolymer of tetrafluoroethylene and ethylene, copolymer of chlorotrifluoroethylene and ethylene.

In particular, perfluoropolymer is more preferable than partially-fluorinated polymer. Further, copolymer is more preferable than homopolymer as a fluorofiber.

The fluorofiber includes a mixture of perfluoropolymer and partially fluorinated polymer. Further, said perfluoropolymer and partially-fluorinated polymer include a mixture of fibers with different physical properties.

When flocking flocks composed of said mixed fiber, shape (cross section), size, filiform shape in each fiber is in the same conditions as said polyethylene fiber, and is not specifically limited to. However, larger size is preferable especially in the case of fluorofiber. Preferable diameter of one fiber converted as circular section, is about 100–200 μm.

The fiber employed in the invention basically obtained by melt spinning of said specific polyethylene resin is not specifically limited to, but includes monofilament and multifilament. A fiber-like material obtained by some methods, for example, a representative method of gel-spinning is also included as a fiber of the invention.

The fiber or fiber-like materials are not specifically limited to with respect to shape, length and size. For example, the shape thereof as profile includes circle, hollow and irregular shape. The size of the fiber or fiber-like material as converted into circular section is about 5–150 μm, preferably 20–120 μm in diameter. With respect to length thereof, a long or continuous filament is preferable for pile stitch and pile fabric. The section of hollow and irregular shape fibers is converted into circular section by eliminating space. Thus, there is no need for conversion with respect to original circular section.

When flocking is conducted using filament, filiform, i.e., multifilament is generally employed. The number of monofilament in multifilament is not specifically limited to, but preferably about 10–500 in considering weaving characteristics during flock formation by pile fabric. The range of number of monofilament depends on size of filament. When filament size is large, the number of monofilament becomes small to make it easier to weave the filament. The polyethylene fiber of the invention corresponds to about 400–15,000 deniers, when using fiber composed of 100 monofilaments having a size of 20–120 μm.

The filaments are not specifically limited to, but include single yarn with or without twisting, double yarn without twisting, twisted yarn prepared by twisting two or more of single yarn. Examples of twisted yarn are S twist, Z twist, co-twist, soft twist, hard twist, double twist, crepe twist or a mixture of two or more. Covered yarn prepared by coil-like wrapping filament around wadding is also included. Preferable filaments are double yarn, twisting yarn and covered yarn, more preferable is twisting. The filaments include spun yarn. Such double yarn, twisting yarn and covered yarn may be monofilament or a mixture of monofilament and multifilament. The filament of the filiform may be composed of filaments having the same diameter or filaments having different diameters mixed in a suitable proportion.

Said filaments may be composed of filaments of polyethylene fiber having different diameter. Further, a mixture of said polyethylene fiber with other synthetic fibers (other types of fibers) may be flocked.

A method for preparing a flocked component comprising a flocked member and a supporting base is described below.

The flocked member is preferably formed by uprightly flocking apex-cut pile (cut pile). However, upright-flocking is not an essential condition of the invention. Thus, piles all or part of which are not cut and/or flock formed in an inclined condition may be acceptable when the effects of the invention are not lost. The flock may be loop pile or a mixture of cut pile and loop pile.

A typical method for preparation of a flocked member is a method of flocking using pile fabric or a pile stitch.

Specifically, the method comprises forming knitted or woven pile fabric with fibers composing supporting base 10 and fibers composing flocked member 12 in such a manner that the latter becomes pile fabric or pile stitch, and cutting the pile prepared. In other words, the flocked member comprises so-called cut pile. The pile fabric or pile stitch may be single pile or double pile. The fibers for pile may be set by forming a coating layer 11 composed of a suitable resin to fix the opposite end of pile side more reliably leading to prevention of removal of fibers, when necessary. The fiber composing supporting base 10 is not specifically limited to, but includes fibers made up of polyester, polyamide, polypropylene, acrylic polymer and like synthetic fiber, natural fiber, chemical fiber and the like. The resin forming said coating layer is not specifically limited to, but preferably heat-resistant resin. The foregoing relates to a cut pile structure. However, a flocked member with so-called loop-like pile structure without cutting single pile fabric is also covered by the invention.

As mentioned above, with respect to pile fabric and pile stitch, acceptable are double face cut pile to prepare cut pile by cutting double weaved pile obtained with double pile weaving machine into two portions and loop-shaped pile obtained with single pile weaving machine. In addition, high-low pile (long-short pile) with partially ups and downs in pile length may be acceptable.

The flocked members obtained according to the variety of processes are different in distribution condition, i.e., flock (pile) density, depending on size of filaments, size of yarns, methods of production thereof. The flocked density is not specifically limited to, but may affect effects of the invention. Preferable flock density is about 1,000 to about 200,000 per unit area (1 cm$^2$) as converted into single yarn. Length of flock is not specifically limited to, but generally about 3–10 mm.

As mentioned above, the flocked component is preferably back-coated by suitable resin in opposite face to pile face. In this case, coating method is not specifically limited.

The flocked component is converted into the stabilizer of the invention by cutting the flock in a desired dimension according to shape and size of supporting base, followed by fixing the flocked component on the supporting base 8. Formation of supporting base, dimension, material and fixing methods thereof are not specifically limited. The fixing methods include a method of adhering flocked component on the supporting base with adhesive (heat-resistant one is preferable), a method by physical clamping or screwing.

When fixation, suitable cushioning medium such as rubber, sponge, felt, etc., may be intervened between said supporting base and flocked component.

A cleaning section whose width is larger than the width of the stabilizer may be formed at the upper position of the stabilizer, and then integrated with the stabilizer. The cleaning section is formed so as to clean and eliminate foreign materials such as dust adhered to the window during opening and closing of a window glass leading to complete removal by catching of foreign materials by the stabilizer. The flocked member of the invention comprising polyethylene fiber may be applied to the cleaning section. In this case, however, length of flock of the cleaning section is preferably longer than that of the stabilizer. Similarly, smaller diameter of fiber and higher pile density of flocks of the cleaning section than those of the flocked member are preferable.

Figure 6:
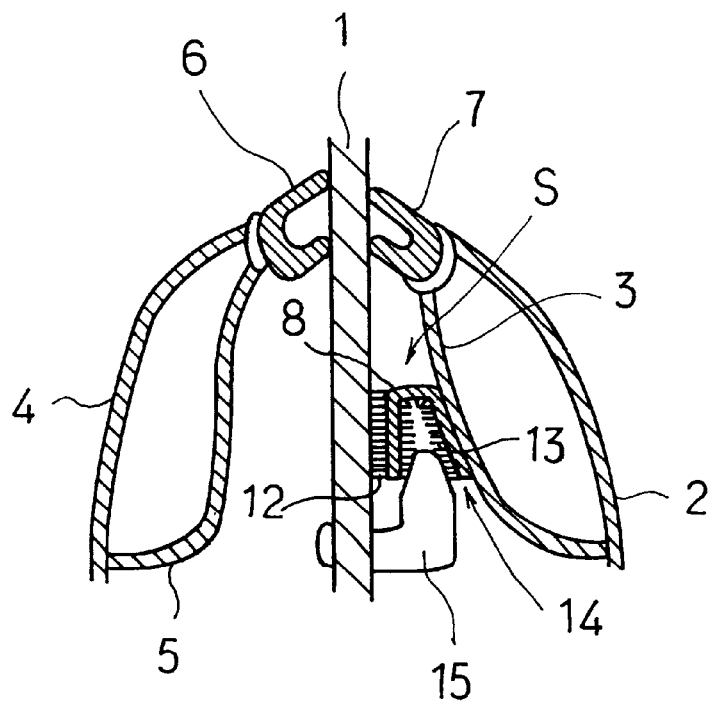
FIG. 6 is a schematic sectional view showing another embodiment of a front door of a car.

In addition, the fiber of the invention may be flocked on the inside surface of stopper pad 14 attached to the window to form a flocked member as shown in FIG. 6. In general, stopper 15 is attached to the lower position of the a window of the a car. The stopper 15 blocks upward movement of the window, for example, by slipping and intermeshing the stopper with stopper pad 14 formed on reinforcing panel 3 at the inner section. The stopper pad 14 is attached so as to catch the stopper 15. The stopper 15 gets into the stopper pad 14 to block upward movement of the window leading to inhibit vibration of the window on full close. A structure of the stopper pad 14 is not specifically limited, but is shown in FIG. 6. The flock of the invention may be applied to the section at which the stopper is contacted with the stopper pad 14, to form flocked member 12 intervening with supporting base 10, etc. In this case, the stopper pad 14 may be integrated with the stabilizer of the invention. The fiber of the invention may be applied to the section at which the stopper is contacted with the stopper pad 14, to form flocked member 12 as shown in FIG. 6, when producing such stabilizer. Such constitutions extend the utility of the fiber of the invention. The stopper pad 14 is one of embodiments of window stabilizer of the invention.

BEST MODE FOR CARRYING OUT THE INVENTION

The present invention will be described below in greater detail using examples and comparative examples. However, the invention is in no way limited to these examples.

EXAMPLE 1

In this example, double-faced cut pile prepared by cutting double cloth produced with double pile weaving machine at the center thereof into two pieces was employed as a flocked component. The double-faced cut pile was fixed on the base of the stabilizer to evaluate the cut pile on a variety of properties. For the evaluation tests, flocked member and supporting fabric retaining the flocked member were prepared according to the following procedure.

<Design of supporting fabric>

The supporting fabric was designed in the following conditions :

2 ends of warp (30 count of yarn) and 2 picks of weft (40 count of yarn) each made of spun polyethylene terephthalate fiber in 44 picks/inch and 55 ends/inch.

<Design of flocked member>

A multifilament (500 d/50 f) was first prepared using single yarn having a molecular weight of 1,000,000, a circular section and a diameter of 38 $\mu$m prepared by spinning high-molecular-weight polyethylene as high as about 1,000,000 of molecular weight. The multifilament was S-twisted in 120 times/m. Two multifilaments S-twisted were subsequently doubled and Z-twisted in 120 times/m to obtain one twisting yarn. Thus, design of flocked member with 10 ends/cm and 9 picks/cm was accomplished.

According to said designs, two pieces of cut pile fabric were obtained by preparing double pile fabric having a pile length of 5.3 mm, fabric width of 40 mm and flock width of 15 mm with a double pile weaving machine followed by cutting the double pile fabric into two portions at the center thereof. The cut pile fabric was then back-coated at the opposite side to pile side using acrylate-vinylacetate synthetic resin to prevent removal of flock. A pile density is 18,000 ends/cm$^2$ converted as single yarn.

The cut pile fabric thus obtained was cut into a desired shape to give a flocked component which was subjected to evaluation tests with respect to slip properties, frictional noise (unpleasant sound) and wearability for slipping on a window or glass.

The slip properties were demonstrated as measured value of static coefficient of friction ($\mu s$) and dynamic coefficient of friction ($\mu d$) in dry, semi-wet and wet environments under conditions of 150 mm/s in slipping rate, 400 mm in slipping distance and 7 kg in loading. Said "semi-wet" means a transient condition from wet condition formed by applying water uniformly to slip face of window with spray to dry condition until water is distilled and dried on the slip face.

Figure 4:
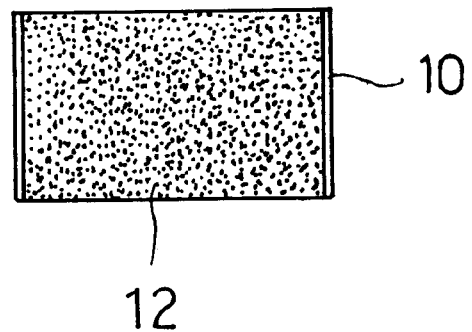
FIG. 4 is a sectional view showing another embodiment of a flocked component of the invention.
Figure 5:
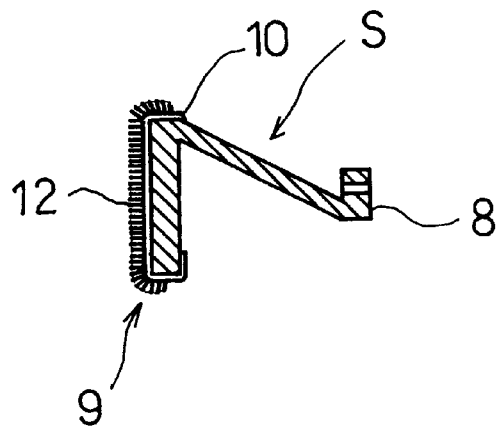
FIG. 5 is a sectional side view of stabilizer with a flocked component of the invention.

"Frictional noise" was determined under the following conditions with applying flock portions to the a window and fixing the stabilizer having a shape shown in FIGS. 4 and 5 (flock contact area of 10×25 mm) in reinforcing panel of door inner panel in front door of a car.

The application was carried out in pressure of 7 kgf. Opening and closing rate of a window was 9 sec/cycle taking 1 cycle as full open and full close. The test procedure was started from a dry condition. Window was wetted in whole area with water by using spray after 3 cycle from starting (dry) condition. Opening and closing a window was continued in the wet condition. Open and close operation of wetted a window caused distillation of water from the surface of the window leading to starting dry condition. Frictional noise generated in the process of wet to dry condition (i.e., semi-wet condition) on the window surface was observed organoleptically.

In addition, "wearability" was determined by observing flock conditions on slipping face after predetermined times of slip of the flocked component on the supporting base of stabilizer employed in said frictional noise test in conditions that flocked component applied to parallely-placed a window at a plessure of 10 kgf was slipped 400 mm within 5.3 second. The flocked conditions were evaluated visually as change of flocked element after slipping.

EXAMPLE 2

A multifilament (500 d/50 f) obtained in example 1 and a PFA monofilament with circular section having a diameter of 180 $\mu$m obtained by melt-spinning from nozzle (4mm$\phi$) were S-twisted in 120 times/m. Two S-twisted yarns were doubled and then Z-twisted to obtain mixed fiber applied to a flocked member. Thus, the flocked member with 10 ends/cm and 9 picks/cm was ready to be produced using the twisted yarn.

Two pieces of pile flocked component were obtained in the same manner as example 1 by cutting the center of double pile fabric prepared with a double pile weaving machine under conditions of said density of ends and picks to have a pile length of 5.3 mm. The cut pile fabric was then back-coated in the same manner as example 1 to prevent removal of flock. A proportion of cross section of PFA mixed was about 50%.

The pile flocked component was cut in a desired shape to evaluate slip properties, frictional noise and wearability in the same conditions as in example 1.

COMPARATIVE EXAMPLE 1

36 ends of PFA filament (33 denier) having a fiber diameter of 47 $\mu$m were prepared to produce 2 ends of multifilaments (1200 d/36 f). Said two multifilaments were S-twisted in 120 times/m, and then Z-twisted in 120 times/m to obtain one twisted yarn.

Pile fabric and pile flocked member consisted of PFA fiber were prepared in the same manner as example 1. The pile flocked member was subjected to evaluation test with respect to slip properties, frictional noise and wearability.

COMPARATIVE EXAMPLE 2

One twisted yarn was obtained in the same manner as example 1 except that single yarn with circular section ($\phi$=30 $\mu$m, 10 deniers) obtained by melt-spinning polymer alloy resin containing nylon 6 (80% by weight) and modified ultra-high-molecular-weight of polyethylene (molecular weight=1,000,000; 20% by weight) from spinning nozzle (0.5 mm$\phi$) was used. The flocked component obtained in the same manner as example 1 using said twisted yarn was subjected to evaluation tests with respect to slip properties, frictional noise and wearability for slipping on a window or glass.

The results of evaluation tests were shown in tables 1 and 2 below.

TABLE 1

| | Slip properties | | |
|---|---|---|---|
| | Dry ($\mu s/\mu d$) | Semi-wet ($\mu s/\mu d$) | Wet ($\mu s/\mu d$) |
| Example 1 | 0.181/0.199 | 0.172/0.254 | 0.055/0.041 |
| Example 2 | 0.180/0.195 | 0.164/0.240 | 0.052/0.040 |
| Comparative Example 1 | 0.174/0.216 | 0.245/0.308 | 0.102/0.042 |
| Comparative Example 2 | 0.190/0.190 | 0.310/0.324 | 0.300/0.311 |

TABLE 2

| | Frictional Noise | | | Wearability | |
|---|---|---|---|---|---|
| | Dry | Semi-wet | Wet | 10 times | 100 times |
| Example 1 | ◉ | ◉ | ◉ | no change | no change |
| Example 2 | ◉ | ◉ | ◉ | no change | no change |
| Comparative Example 1 | ◉ | Δ | ○ | no change | no change |
| Comparative Example 1 | ◉ | x | Δ | no change | no change |

In table 1:
"◉" means that no frictional noise is generated;
"○" means that slight frictional noise is generated but not unpleasant;
"Δ" means that slight frictional noise is sometimes generated and somewhat unpleasant;
"x" means that frictional noise is generated and unpleasant;

As shown in table 1, it is apparent that the flocked members of the examples are superior to those of comparative examples in total evaluation of slip properties and frictional noise in semi-wet and wet conditions. In particular, frictional noise is likely to be generated in semi-wet and wet conditions, which makes the superior effects of the invention clearer.

As shown above, the flocked member of the invention is outstanding in slip properties, which means that open and close of window is not affected by a surface condition of window and conducted smoothly. The window is very comfortable for a driver. Further, power for moving the window may be decreased. The a window stabilizer inhibits generation of frictional noise in any circumstances leading to maintenance of comfortable driving. Further, the a window stabilizer of the invention is excellent in wearing properties and elastic recovery corresponding to durability and free of damage in flocked member during opening and closing of the window under strong pressure as high as 10 kgf.

The flocked member of the invention prevents window from vibration and accomplishes perfect vibration absorption.

The flocked member of the invention is primarily employed as a stabilizer for windows of a car, but may be applied as a flocked element for slip to cleaning brush concerning copying machine, insulation of automatically-controlled door, ground covering material of runway in artificial skiing ground, etc.

What we claimed is:

1. A flocked component for window stabilizer comprising a flock and supporting base, wherein the flock comprises a fiber comprising polyethylene having a viscosity-average molecular weight of 700,000 to 6,000,000, provided that the fiber does not comprise polyethylene modified by unsaturated carboxylic acid, polyester resin, or polyamide resin.

2. A flocked component for window stabilizer comprising a flock and supporting base, wherein the flock comprises:
   (i) a polyethylene fiber comprising polyethylene having a viscosity-average molecular weight of 700,000 to 6,000,000, provided that the fiber does not comprise polyethylene modified by unsaturated carboxylic acid or polyamide resin; and
   (ii) a component fiber.

3. The flocked component for window stabilizer as defined in claim 1, wherein said flock comprises (1) 99–50% cross section ratio of the polyethylene fiber and 1–50% cross section ratio of fluorofiber as the component fiber.

4. The flocked component for window stabilizer as defined in claim 1, wherein said viscosity-average molecular weight of polyethylene ranges from 1,000,000 to 2,500,000.

5. The flocked component for window stabilizer as defined in claim 2, wherein said polyethylene fiber has a viscosity-average molecular weight ranging from 1,000,000 to 2,500,000.

6. The flocked component for window stabilizer as defined in claim 1, wherein said fiber further comprises at least one member selected from the group consisting of ethylene-methylacrylate copolymer, ethylene-methylmethacrylate copolymer, ethylene-ethylacrylate copolymer, ethylene-acrylic acid copolymer, ethylene-methacrylic acid copolymer, ethylene-vinylacetate copolymer, ethylene-propylene copolymer, ethylene-propylene-diene terpolymer, ethylene-butene copolymer, ethylene-propylene-butene terpolymer and ethylene-chlorotrifluoroethylene copolymer.

7. The flocked component for window stabilizer as defined in claim 3 wherein said fluorofiber is perfluorofiber.

8. The flocked component for window stabilizer as defined in claim 3, wherein said fluorofiber is selected from the group consisting of tetrafluoroethylene-perfluoroalkylvinylether copolymer, ethylene-tetrafluoroethylene copolymer and tetrafluoroethylene-hexafluoropropylene copolymer.

9. The flocked component for window stabilizer as defined in claim 1, wherein said fiber is in the form of a yarn selected from the group consisting of double yarn, twisting yarn and covered yarn.

10. The flocked component for window stabilizer as defined in claim 9, wherein said fiber is in the form of a yarn selected from the group consisting of double yarn, twisting yarn and covered yarn.

* * * * *